United States Patent [19]

Brauns et al.

[11] Patent Number: 5,539,904

[45] Date of Patent: Jul. 23, 1996

[54] METHOD FOR DESIGNATION OF DATA IN A DATA BANK AND EXTRACTION

[75] Inventors: Robert A. W. Brauns, Tuxedo Park, N.Y.; Kamy Agrawal, Stamford, Conn.; Vincent Aubrun, New York, N.Y.

[73] Assignee: The Larches Corporation, Boston, Mass.

[21] Appl. No.: 369,896

[22] Filed: Jan. 9, 1995

Related U.S. Application Data

[63] Continuation of Ser. No. 2,107, Jan. 7, 1993, Pat. No. 5,381,555.

[51] Int. Cl.$^6$ .................................................. G06F 12/00
[52] U.S. Cl. .................. 395/600; 364/241.8; 364/253.1; 364/253.2; 364/260.1; 364/DIG. 1
[58] Field of Search ................................. 395/800, 425, 395/600

[56] References Cited

U.S. PATENT DOCUMENTS

| | | | |
|---|---|---|---|
| 4,485,454 | 11/1984 | Kimoto | 395/600 |
| 4,979,098 | 12/1990 | Baum | 395/418 |
| 5,333,252 | 7/1994 | Brewer, III | 395/148 |
| 5,381,555 | 1/1995 | Brauns | 395/800 |
| 5,402,474 | 3/1995 | Miller | 379/93 |
| 5,442,779 | 8/1995 | Barber | 395/600 |

*Primary Examiner*—Eric Coleman
*Attorney, Agent, or Firm*—Cesari and McKenna

[57] ABSTRACT

A method is provided for operating a computer system to automatically provide a utility program with data contained in a data base. The method uses extended character set tokens representing data identification which are initially placed into data memory locations in the utility program and thereafter replaced with the designated data from the data bank.

6 Claims, 2 Drawing Sheets

5,539,904

METHOD FOR DESIGNATION OF DATA IN A DATA BANK AND EXTRACTION

This is a continuation of Ser. No. 002,107, filed Jan. 7, 1993, now U.S. Pat. No. 5,381,555.

BACKGROUND OF THE INVENTION

The present invention contains microfiche Appendices I and II. Appendix I comprises four (4) microfiche having a total of 246 frames. Appendix II comprises one (1) microfiche having 90 frames. This invention relates to computer programs and particularly to operation of programs which utilize data from a data bank for computations in a computer system applications program. In particular the present invention provides a method for extracting data from a data bank for use in connection with a personal computer application program of the spread sheet type.

Spread sheet type programs are frequently used for purposes of analyzing the performances of companies and comparing the performances for making investment decisions. In operation of said spread sheet programs, it becomes necessary to supply data which represents the financial performance of various companies to the spread sheet program so that the program can execute computations which are designated by the spread sheet program operator.

In connection with the operation of other programs, for example programs which are arranged for the graphic display of certain parameters which may represent physical measurements from X-ray data or other test equipment, it is likewise necessary to supply data which is contained in a collection of data. Data from a data collection may also be required in graphics programs or word processing programs.

The assignee of the present invention markets a computer readable data bank, which contains a compilation of the financial performances of companies which are publicly traded. The data included in the data bank is organized under three principal data designating parameters, which include the name of the company whose performance is represented by the data, the type of data and the period for which the data corresponds. According to prior art operations, a person using a spread sheet computer program for purposes of comparing the performance of various publicly traded companies during periods of interest, and also using a data bank, such as that marketed by the assignee of the present invention, would be required to interrupt spreadsheet program operation, obtain the required data from the data bank and manually enter the data into the spread sheet program in order to generate the comparative spread sheet which is of interest. Alternately, the operator may use programs for automatically entering data that require complex operations to designate the data and the location in the spread sheet in which data is to be inserted.

It is an object of the present invention to facilitate the transfer of data from a data bank, such as a financial or measurement data bank, into a utility program which is designed to make use of such data.

SUMMARY OF THE INVENTION

In accordance with the present invention there is provided a method for automatically extracting data from a data collection and automatically supplying the extracted data to a utility program operating in a computer system. The method is used in connection with a collection of data which is organized by a plurality of data designating parameters. The method of the present invention includes loading an extraction program into a computer system prior to operating the utility program. The extraction program includes instructions to enable the computer system to selectively operate the utility program, instructions for specifying data variables in the utility program and instructions for inserting data designating tokens into the utility program in data memory locations corresponding to the specified data variables, and instructions for using the tokens to select the corresponding data values from the data bank and to replace the tokens with designated data values, and instructions for selectively interrupting the operation of the utility program to execute instructions in the extraction program thereby to supply designated data from the data collection to the utility program.

For a better understanding of the present invention, together with other and further objects, reference is made to the following description, taken in conjunction with the accompanying drawings, and its scope will be defined in the appended claims.

DESCRIPTION OF THE INVENTION

Figure 1:
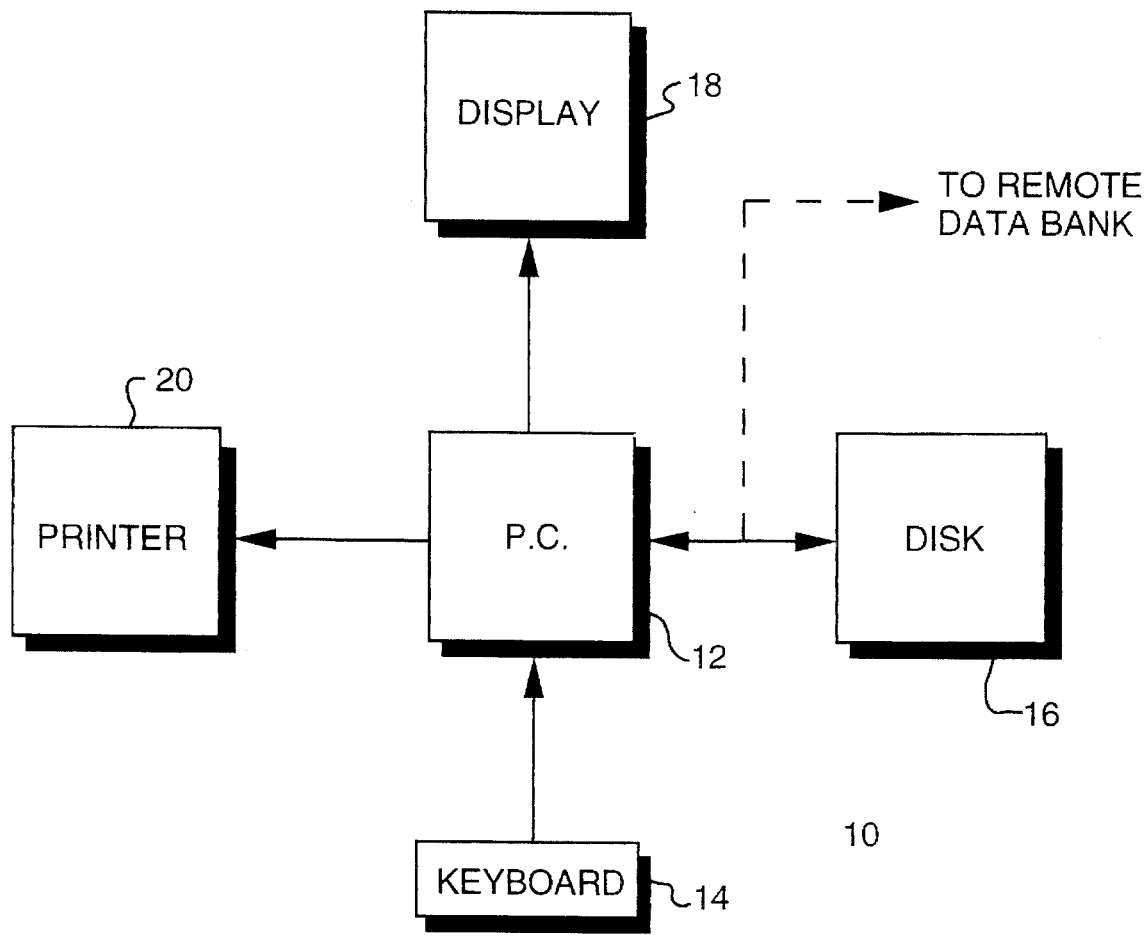
FIG. 1 is a block diagram of a computer system in which the method of the present invention may be practiced.

In connection with the operation of a spread sheet computer program the program operator has the capability of designating rows and columns of data cells to form a spread sheet "shell" into which data which is significant with respect to the desired computations may be inserted. In connection with financial analysis for investment purposes, the data which is to be included in such a spread sheet computation frequently comes from a data base which includes financial performance data of publicly traded corporations which is organized according to the corresponding corporation as a first data designating parameter, the data type, for example, gross operating revenues, extraodinary items, cost of goods sold, overhead and profit, as a second data designating parameter and a time period, for example, fiscal quarter or fiscal year, as a third data designating parameter.

In connection with the preparation of a financial analysis spread sheet, the program operator frequently selects the corporations of interest for the particular analysis being undertaken, the items corresponding to revenues, costs and/or profit which are to be the subject of the spread sheet and the fiscal periods of interest in connection with the spread sheet. In order to perform the analysis the operator must supply to the spread sheet program the data values for the designated parameters.

There are marketed by time sharing services, or otherwise, such as by disk supplied systems, data base collections which include financial information on publicly traded companies, which may be selected by a program operator for analysis according to the requirements of his spread sheet. The operation of extracting particular data values from such a data base and supplying them to a spread sheet program has heretofore been significantly laborious, and frequently requires the program operator to manually transfer the data by use of the computer keyboard. Other methods of data transfer have been developed, but these methods frequently require complex operations on the computer that are beyond the capability of computer operators performing financial analysis.

In connection with the present invention it has been observed that utility progams, such as spread sheet programs, set up data memory locations which correspond to specified data cells which are to be used in operation of the program. These data memory locations are allocated when the spread sheet shell is constructed, and normal operation of the spread sheet would require the manual entry of numerical values into such memory locations by operation of the spread sheet program. The present inventors have developed a method which greatly simplies entry of data into such memory locations directly from a data bank. According to the present invention, the data memory locations are provided initially with data designating tokens, which correspond to extended character set values. The data designating tokens do not correspond to the actual values of the data which are to be placed in the location, but correspond to coded representations of the data designating parameters which may be used to extract corresponding data from a data bank organized according to the data designating parameters.

In a typical spread sheet utility program, such as LOTUS 1-2-3, data memory locations corresponding to data cells, unless otherwise specified by the operator, have memory and display allocations of nine characters. A 16 bit memory location is allocated for each character in the data cells. If only 8 characters of data are provided to each data cell, a character space remains in each cell so that the data cells are separated and easily distinguished on the the display. According to the present invention the operator initially uses a program to provide the data memory locations corresponding to data cells of the utility program with a set of tokens which identify the data which is to be inserted into the utility program, but which do not themselves constitutute the designated data. In the case of a typical spread sheet program, the default setting of column width is 9 character spaces on the display. In order to leave a blank character space for column separation on the display a set of 8 character tokens are used. The first character can be used to contain a selected unique identification token, which is used in each data memory location for which data is to be extracted from a data base. The second character location can be used to identify the data base from which data is to be taken if more than one data base is available and it also can be used to designate a portion of the period corresponding to the data to be identified. The third and fourth character locations may designate a company which the data is representative of. The fifth and sixth character locations can be used to identify an item, such as gross sales, overhead, etc. which is to be included in the data memory location and the seventh and eighth character locations can be used to further identify the period of the appropriate data.

Accordingly, the operator of the system may use the method of the present invention to manually identify the data which is to be used, rather than to insert the data itself.

While at first glance the use of data designating tokens and the manual insertion of such tokens may seem to represent very little savings in computer operator time, such is not the case. In a typical data operation, an operator may wish to designate similar information for various periods for the same company. Accordingly, it is possible to insert in a very rapid manner the company designating tokens in all data memory locations which are to be used for that particular company. Likewise, vertical lines of a spread sheet may all represent the same time period. Accordingly, designation of time tokens can be rapidly accelerated by designating columns at a time using the windows available in a spread sheet program. Likewise, designation of items on a spread sheet may be horizontally disposed on the spread sheet and rapid window designations for such item designations can be used.

FIG. 1 illustrates a typical personal computer system intended for financial analysis which may use the method of the present invention. The computer system 10 includes a personal computer 12 which has an associated keyboard 14 and display 18. A disk memory 16 is provided for inclusions of programs and the data base from which data is to be extracted. Optionally a printer 20 may be provided for printing out the resulting spread sheets which are obtained using a financial analysis spread sheet program.

Figure 2:
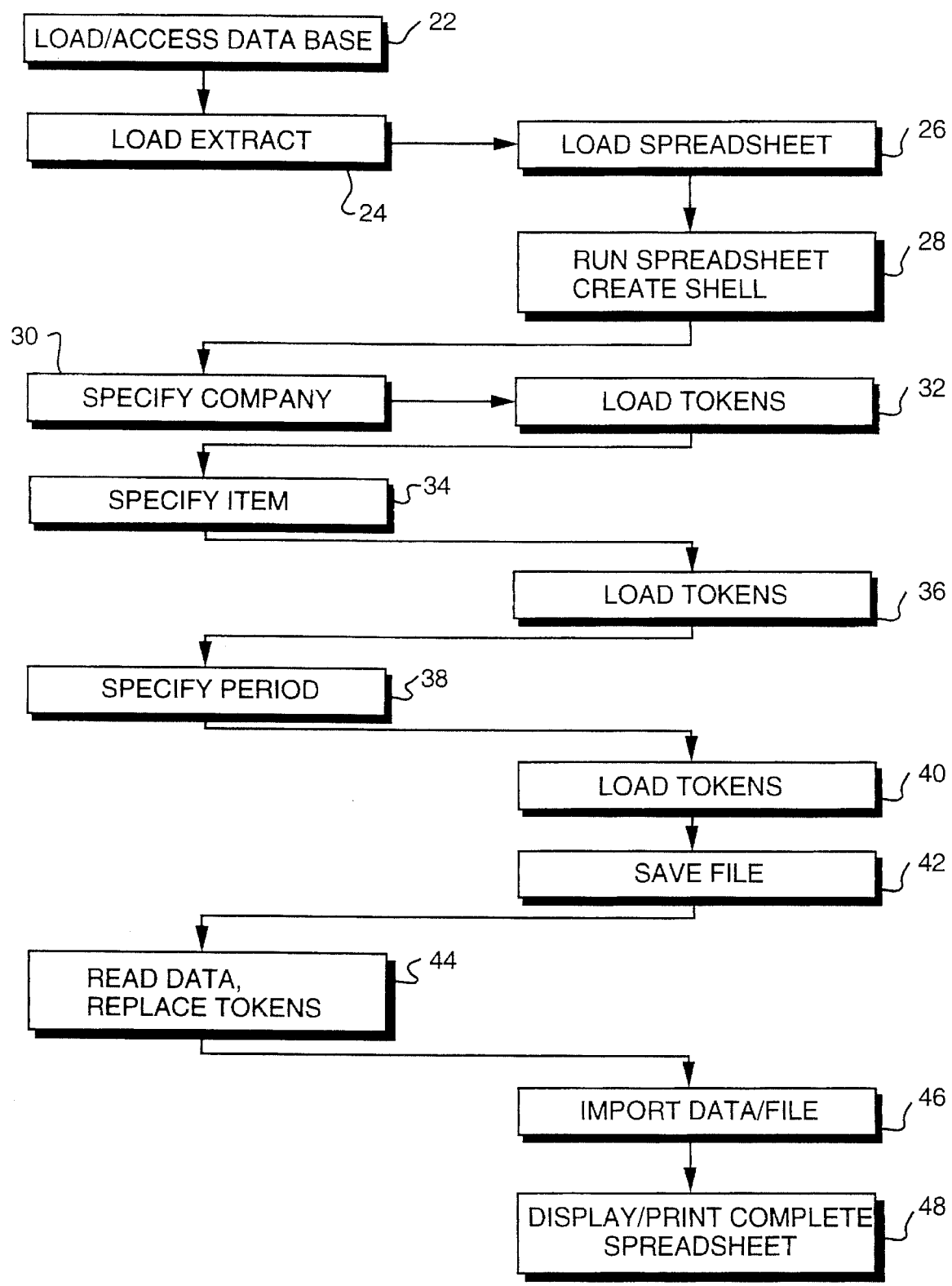
FIG. 2 is a flow diagram illustrating the operation of a program in accordance with the present invention.

Referring to FIG. 2 there is shown the typical operation of the method of the present invention on a personal computer using spread sheet data. Initially at step 22 a data base is loaded into the disk memory 16. Alternately a remote data base may be used as indicated in dotted lines in FIG. 1 and accordingly step 22 would consist of obtaining access to the remote data base. At step 24 the EXTRACT program, which is included as a microfiche appendix to this application, is loaded into the PC. The EXTRACT program which is included in the microfiche appendix is specifically configured for operation on an IBM or IBM compatible personal computer, and specifically configured for operation with the data base of financial information which is marketed by the assignee of the present invention and with the LOTUS 1-2-3 spread sheet program. Once the EXTRACT program has been loaded and begins operation it performs its own time sharing function with respect to operation of a spread sheet program. Accordingly, a spread sheet may be loaded at step 26 under an interrupt and transfer instructions of the EXTRACT program. The EXTRACT program itself maintains continous monitoring of keyboard entries to detect those keyboard entries which designate an interrupt of a spread sheet program operation so that the EXTRACT program can undertake its own operations. Other than this monitoring, the operation of the spread sheet is normal as viewed by the system operator. At step 28 the system operator runs the spread sheet program and creates the spread sheet shell which lists the designations of the information in rows and columns upon which he intends to perform a financial or other operation. At this point the operator is ready to begin designating the data from the previously loaded data base which will be used by his spread sheet program. At step 30, by operation of designated keys, for example, the ALT and F9 keys, the EXTRACT program assumes primary operation of the computer system. In its operation, the EXTRACT program automatically calls portions of the spread sheet program for purposes of designating files and portions of the files to be extracted from the spread sheet program and operated on by the EXTRACT program. To use portions of the spread sheet program, the EXTRACT program inserts commands into the keyboard buffer to cause operation of the spread sheet program and monitors the display buffer for a "ready" message indicating a further command may be used. In its initial operation the EXTRACT program displays a menu of operations above the spread sheet. To the user it appears as if the spread sheet program is still operating, and the EXTRACT program provides for operation designation in a similar manner to the spread sheet program, using selection of operations to be undertaken. The first operation of the EXTRACT program is to select the data parameter to be specified and specify the data locations in the spread sheet program for which it is desired to insert data designating tokens.

Using the select operation, the operator may proceed to designated data locations by use of the cursor using portions of the spread sheet program to specify for a range of data in which all data locations are to receive the same data designating tokens, such as the company to which the data pertains. In some operations the range for the company token may be an entire spread sheet, while in other operations it may be merely one column or one cell of a spread sheet. Once the data range has been specified the designated memory locations are removed as a data file from spread sheet to a separate disk location using the spread sheet file remover routine.

The EXTRACT program thereafter prompts the operator to enter in common English form the data designating values to be entered into the designated data locations. For designation of a company, the user may be prompted to enter the trading symbol for the company. If the symbol is unknown, a help program routine can be activated to provide a list of symbols for various companies in response to an entered company name. When the correct company symbol has been entered into the computer by the operator, the EXTRACT program, by use of a lookup table, translates the entered symbol into a data designating token using the expanded character set of values and writes this token into the data locations on the file which has been removed from the spread sheet program. The file is then imported back into the spread sheet program with the tokens in the data locations. The data designating tokens, which may include foreign characters, appear on the spread sheet in the data value locations and indicate that a portion of the required data designating tokens have been entered. In one option available in the EXTRACT program, control is automatically returned to the spread sheet program after each entry of a token. In another version the operation can remain in the EXTRACT program until all tokens have been entered for each of the data locations.

The operator can then continue the select operation using the ALT and F9 keys to return to the EXTRACT operation and specify additional tokens to be inserted into the spread sheet program. For example, at step 34 the operator will be prompted to designate item identifications and may use a help program to obtain the symbols used for items to be designated. Again, using a lookup table, the EXTRACT program generates tokens for insertion into the data memory locations representative of the items selected. At step 38 the operator will select periods for data variables to be selected and these again will be transformed into tokens and placed in the data memory locations of the spread sheet program where the desired data is to be inserted.

Once complete specifications have been placed in the data memory locations of the spread sheet program, the operator would preferably save the file at step 42 and then return to the EXTRACT program at step 44 wherein the program would scan the data variable locations of the spread sheet file to identify what locations include an identification token, indicating that there is an indentification of data to be inserted into a data memory location, and the additional tokens which indicate the designation in the data bank of the data which is to replace the set of tokens in the data memory location. The program can then automatically look up in the data base the data variables and substitute the actual data into the data memory locations in a file which has been removed from the spread sheet file in the locations of the corresponding data designating tokens. After replacement of token values with data values the file is imported into the spread sheet file for further operation by the system operator.

According to an additional feature of the EXTRACT program, it is possible for the operator to designate questions to be placed by the EXTRACT program into the data bank. For example, it is possible for the operator to request identification of all publicly traded companies in a particular line of business designating the corresponding identification number for the line of business. Accordingly, the EXTRACT program can therby create a list of such companies and the operator can thereafter provide for designation of data to be extracted in connection with such companies.

Appendix I to this application is a listing of a program which operates as an EXTRACT program in accordance with the method of the present invention on an IBM personal computer using the data bank marketed by applicant. The Appendix I program uses routines available in an additional program called "Programmer Essentials, C Utility Library" which is available from Essential Software, Inc. 29 Salter Place, Maplewood, N.J. 07040. Appendix II to this application is a microfiche copy of a users manual which represents a guide to the full utilization of the program which is included in Appendix I.

While there has been described what is believed to be the preferred embodiment of the present invention, those skilled in the art will recognize that other and further modifications may be made thereto without departing from the spirit of the invention and it is intended to claim all such modifications as fall within the true scope of the invention.

We claim:

1. A data processing system having a data system in which data included therein are organized in accordance with data-designating parameters and operable by application thereto of the data-designating parameters to fetch selected data stored therein, the computer system including:

A. a utility program, said data system being external to said utility program, the utility program
  i. presenting to a user an active working file, to permit the user to enter data into data areas of the working file,
  ii. incorporating into the data areas of the working file the data entered by the user, and
  iii. displaying the results of incorporating the data;

B. tokens for inclusion in selected data areas of the working file, each token representing data-designating parameters designating selected data in the data system;

C. data extraction means for
  i. responding to the presence of a token in each of the data areas by automatically (1) applying to the data system the data-designating parameters represented by the token and (2) entering into the data area containing the token data that the data system fetches in response to the application of the parameters represented by the token; and
  ii. further responding to the presence of the token in the data area by automatically, upon invocation of an appropriate command, re-entering the data system and updating the data entered into the data area.

2. A method of operating a computer system including the steps of:

A. operating a utility program to (1) establish and present to a user a working file including one or more data areas to permit the user to enter data into the data areas, and (2) incorporate into the working file data entered into the data areas by the user and present the results to the user;

B. specifying in one or more data areas, using tokens representing data-designating parameters, data to be extracted from an external data system and entered into these data areas;

C. for each data area containing a token, automatically at preselected times extracting from the external data system the data designated by the data-designating parameters represented by the token and entering the extracted data into the data area containing the token.

3. A computer system for operating a data processing program said system including:

A. data utility means for
1. establishing an active working file with a plurality of data areas, and
2. manipulating the data held in the data areas during a data manipulation operation;

B. data files external to said working file containing data for insertion into selected data areas in said working file, said data files being organized in accordance with data-designating parameters;

C. means for automatically extracting data from the external data files and inserting the extracted data into the selected data areas, said data extracting means including:
1. data specifying means for specifying in each of the selected data areas, using tokens representing data-designating parameters, data to be extracted from the data files and inserted into these areas, and
2. extraction and insertion means for extracting from the data files the data specified by said data specifying means and inserting the extracted data into the selected data areas containing the tokens specifying those data.

4. A method of operating a computer system, said method including the steps of:

A. operating a data processing program for manipulating data, the data processing program establishing one or more data areas for holding data that the data processing program is to manipulate, and at selected times manipulating the data held in the data areas;

B. generating tokens, each of which includes data-designating parameters corresponding to particular data in a data system external to the data processing program; and C. inserting into at least one data area a token containing data-designating parameters;

D. using the information in the token, extracting from the data system the data designated by said parameters and inserting the extracted data into the data area containing the token associated with the data;

E. automatically, at times corresponding to selected times that the data processing program manipulates the data, updating the data in said data area by using the token therein to extract updated data from the data system, and inserting the updated data in the data area;

F. repeating steps D and E, as appropriate.

5. The method of claim 4, further including the step of automatically re-entering the data system and updating the data entered into said data areas in response to an appropriate command.

6. The method of claim 4, further including the step of entering the same data in each of the data areas containing a token representing that data.

\* \* \* \* \*